US011926171B2

(12) United States Patent
Roudaut

(10) Patent No.: US 11,926,171 B2
(45) Date of Patent: Mar. 12, 2024

(54) NIB FOR WRITING FELT PEN

(71) Applicant: Société BIC, Clichy (FR)

(72) Inventor: Etienne Roudaut, Clichy (FR)

(73) Assignee: SOCIÉTÉ BIC, Clichy (FR)

( * ) Notice: Subject to any disclaimer, the term of this patent is extended or adjusted under 35 U.S.C. 154(b) by 79 days.

(21) Appl. No.: 17/754,292

(22) PCT Filed: Sep. 28, 2020

(86) PCT No.: PCT/EP2020/077114
§ 371 (c)(1),
(2) Date: Mar. 29, 2022

(87) PCT Pub. No.: WO2021/063892
PCT Pub. Date: Apr. 8, 2021

(65) Prior Publication Data

US 2022/0388330 A1 Dec. 8, 2022

(30) Foreign Application Priority Data

Sep. 30, 2019 (EP) ..................................... 19306221

(51) Int. Cl.

| | |
|---|---|
| ***B43K 8/10*** | (2006.01) |
| ***B43K 1/00*** | (2006.01) |
| ***B43K 1/12*** | (2006.01) |
| ***B43K 5/03*** | (2006.01) |
| ***B43K 8/02*** | (2006.01) |
| ***B43K 8/03*** | (2006.01) |

(52) U.S. Cl.
CPC .................. *B43K 8/10* (2013.01); *B43K 1/12* (2013.01); *B43K 5/03* (2013.01); *B43K 8/024* (2013.01); *B43K 8/03* (2013.01); *B43K 1/003* (2013.01)

(58) Field of Classification Search
CPC . B43K 8/10; B43K 1/003; B43K 1/12; B43K 5/03; B43K 1/006; B43K 5/02; B43K 1/01; B43K 5/18; B43K 8/02; B43K 8/022; B43K 8/026
USPC ..................... 401/198, 199, 40–42, 132–134
See application file for complete search history.

(56) References Cited

U.S. PATENT DOCUMENTS

| | | | | |
|---|---|---|---|---|
| 2,269,232 | A | 1/1942 | Schreiner | |
| 3,399,020 | A | 8/1968 | Margolis et al. | |
| 3,993,409 | A | 11/1976 | Hart | |
| 4,588,319 | A * | 5/1986 | Niemeyer .............. | B43K 7/005 401/199 |
| 2004/0240925 | A1 | 12/2004 | Iida et al. | |

(Continued)

FOREIGN PATENT DOCUMENTS

| | | | |
|---|---|---|---|
| CN | 204801286 | U | 11/2015 |
| EP | 0570866 | A1 | 11/1993 |

(Continued)

OTHER PUBLICATIONS

International Search Report and Written Opinion issued in International Application PCT/EP2020/077114, DATED Dec. 1, 2020 (18 pages).

*Primary Examiner* — David J Walczak
(74) *Attorney, Agent, or Firm* — Bookoff McAndrews, PLLC

(57) ABSTRACT

A nib for a refillable free ink writing felt pen includes a body and a dry ink tank including dry ink, the dry ink tank being delimited by the body of the nib and a dry ink tank wall including a breakable portion.

20 Claims, 4 Drawing Sheets

(56) References Cited

U.S. PATENT DOCUMENTS

| | | | | |
|---|---|---|---|---|
| 2008/0166177 | A1 | 7/2008 | Alghabban | |
| 2012/0070220 | A1* | 3/2012 | Ruiz, Sr. .......... | A61B 17/00491 401/134 |

FOREIGN PATENT DOCUMENTS

| | | | |
|---|---|---|---|
| EP | 1050418 | A2 | 11/2000 |
| EP | 1266770 | A1 | 12/2002 |
| JP | 4550396 | B2 | 9/2010 |
| WO | 9218339 | A1 | 10/1992 |
| WO | 2007107057 | A1 | 9/2007 |

* cited by examiner

[Fig.1]
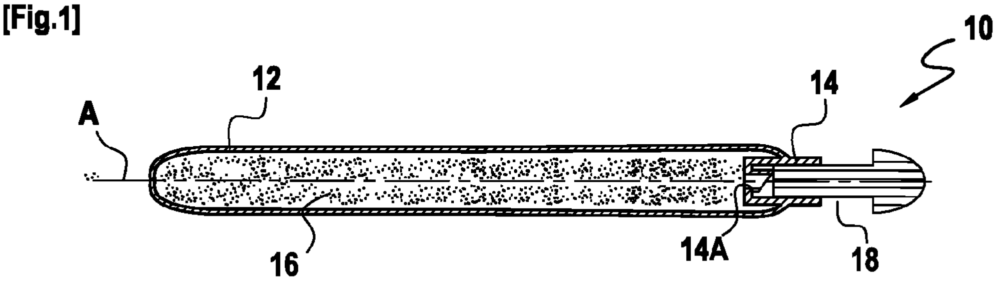
[Fig.2]
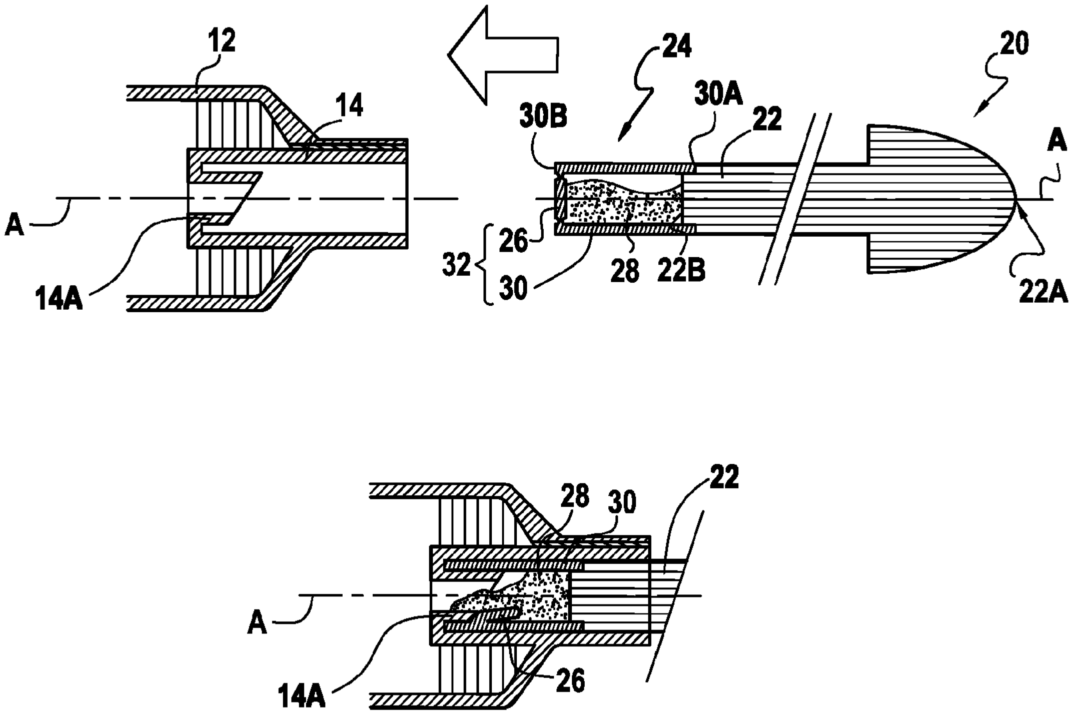

[Fig.3]
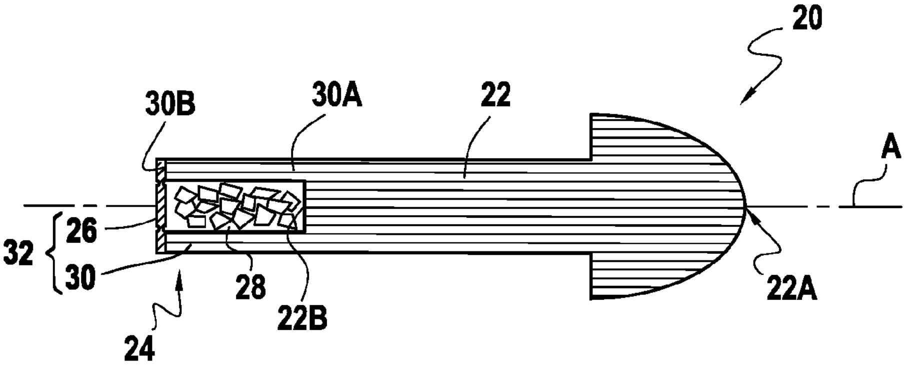
[Fig.4]
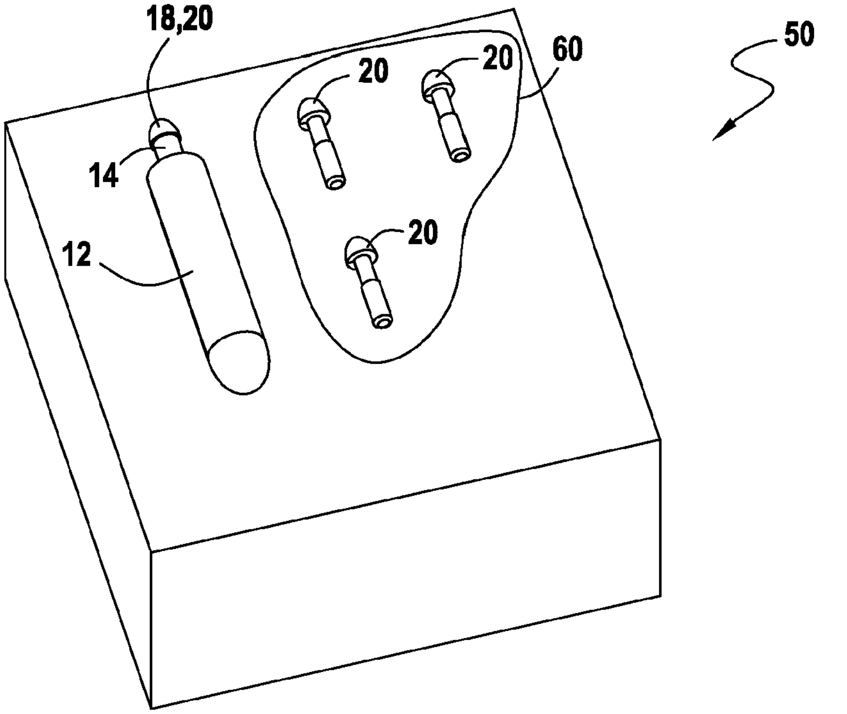

[Fig.5]
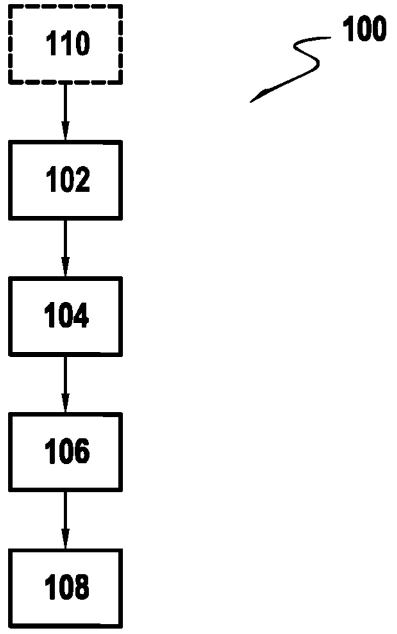
[Fig.6]
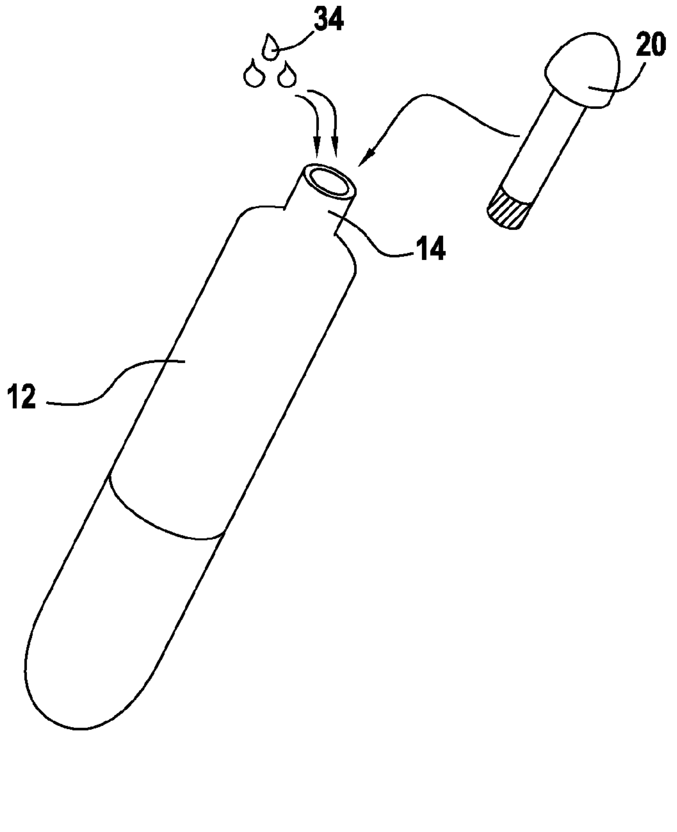

[Fig.7]
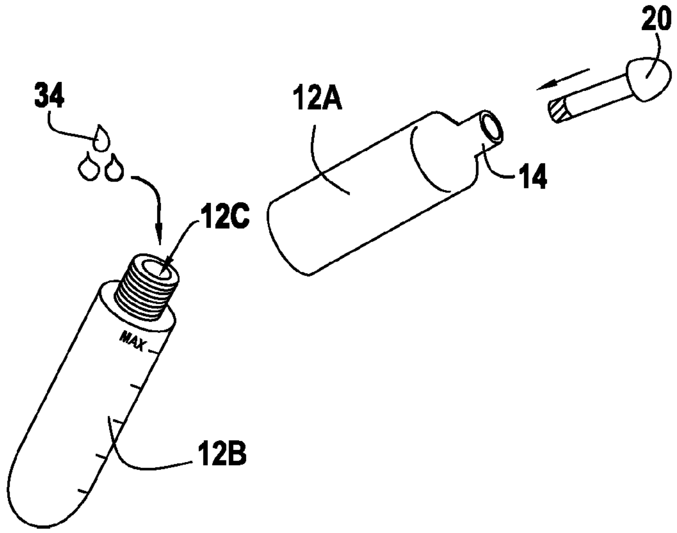
[Fig.8]
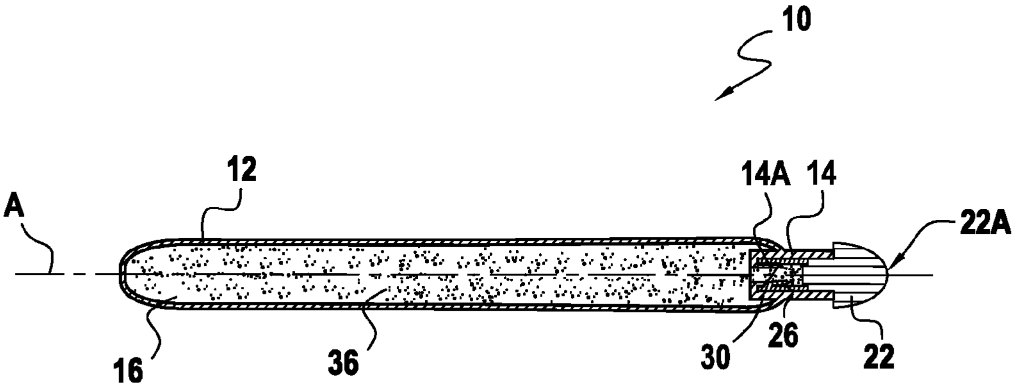

NIB FOR WRITING FELT PEN

CROSS-REFERENCE TO RELATED APPLICATION(S)

This application is a National Stage Application of International Application PCT/EP2020/077114, filed on Sep. 28, 2020, now published as WO 2021/063892 A1, and which claims priority to European patent application EP19306221.3, filed on Sep. 30, 2019, which is incorporated by reference herein in its entirety.

TECHNICAL FIELD

The present disclosure is related to a nib for a free ink writing felt pen, and more particularly to a nib for a refillable free ink writing felt pen.

BACKGROUND

Free ink writing felt pen may be refillable. However, generally, refilling a free ink writing felt pen with ink might prove difficult and sometime messy.

SUMMARY

Currently, it remains desirable to improve the refilling of a writing felt pen.

Therefore, according to embodiments of the present disclosure, a nib for a refillable free ink writing felt pen is provided. The nib for the refillable free ink writing felt pen may include:

- a body including:
  - a first end, configured to deliver ink to a writing support;
  - a second end, opposite the first end, configured to be inserted in a nib receiving part of a refillable free ink writing felt pen body of the refillable free ink writing felt pen; and
- a dry ink tank including dry ink, the dry ink tank being delimited by the second end of the body of the nib and a dry ink tank wall including a breakable portion.

The dry ink tank wall may include a tubular wall having a first end attached to the second end of the body of the nib and a second end, opposite the first end of the tubular wall, the breakable portion film being attached to the second end of the tubular wall.

The tubular wall may be made of the same material as the body of the nib.

The tubular wall may be made of a non-porous material.

The tubular wall may include polypropylene or polyethylene.

The body of the nib may be a sintered powder nib comprising polypropylene or polyethylene.

The body of the nib may include fibres agglomerated by a resin, the fibres being polyester, acrylic, polyamide or polyacrylonitrile and the resin being polyurethane or urea aminoplast.

The body of the nib may be an extruded nib comprising polyacetal, polypropylene or polyethylene.

The present disclosure also provides a refillable free ink writing felt pen body. The refillable free ink writing felt pen body may include a nib receiving part and a liquid ink tank, the nib receiving part may include a breaking part configure to break a breakable portion of a dry ink tank of a nib upon insertion of the nib into the nib receiving part.

The present disclosure also provides a writing kit. The writing kit may include an above-defined refillable free ink writing felt pen body and one or more above-defined nibs.

A nib free of a dry ink tank may be received in the nib receiving part of the refillable free ink writing felt pen body.

The present disclosure also provides a refillable kit for a refillable free ink writing felt pen body. The refillable kit may include one or more above-defined nibs.

The present disclosure also provides a method for filling an above-defined refillable free ink writing felt pen body. The method may include:

- filling the liquid ink tank with water;
- inserting an above-defined nib in the nib receiving part;
- breaking the breakable portion of the dry ink tank with the breaking part of the nib receiving part so as to free the dry ink;
- mixing the dry ink and the water so as to make fresh liquid ink.

A used nib received in the nib receiving part may be removed from the refillable free ink writing felt pen body.

Filling the liquid tank with water may be carried out through the nib receiving part.

Filling the liquid tank with water may be carried out through an opening of the liquid ink tank.

As the nib has a dry ink tank, the refilling of the liquid ink tank of the refillable free ink writing felt pen is made less complicated. Indeed, the user is not in contact with liquid ink but with water and thus, the risks for the user of staining him/herself with liquid ink are reduced compared to refillable free ink writing felt pen in which the liquid ink tank is refilled with liquid ink. Moreover, as the ink is dry form in the dry ink tank attached to the body of the nib, the user is not in contact with the dry ink either.

By changing the nib when refilling the refillable free ink writing felt pen, the refillable free ink writing felt pen is provided with a fresh nib which is free of damages that may arise during utilisation of the nib, i.e., during writing.

By tubular wall, it is intended to define a wall that may or may not have a cylindrical section.

It is intended that combinations of the above-described elements and those within the specification may be made, except where otherwise contradictory.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the disclosure and together with the description, serve to explain the principles thereof.

BRIEF DESCRIPTION OF THE DRAWINGS

FIG. 1 shows a representation of an exemplary refillable free ink writing felt pen according to embodiments of the present disclosure;

FIG. 2 shows a representation of an exemplary nib according to embodiments of the present disclosure;

FIG. 3 shows a representation of another exemplary nib according to embodiments of the present disclosure;

FIG. 4 shows an exemplary refillable kit and an exemplary writing kit according to embodiments of the present disclosure;

FIG. 5 shows a flow chart of a method according to embodiments of the present disclosure;

FIGS. 6 and 7 show steps of filling a liquid ink tank with water and inserting a nib in a nib receiving part;

FIG. 8 shows an exemplary refillable free ink writing felt pen after insertion of a nib according to embodiments of the present disclosure.

DETAILED DESCRIPTION

Reference will now be made in detail to exemplary embodiments of the disclosure, examples of which are illustrated in the accompanying drawings. Wherever possible, the same reference numbers will be used throughout the drawings to refer to the same or like parts.

FIG. 1 shows a representation of an exemplary refillable free ink writing felt pen 10 according to embodiments of the present disclosure. The refillable free ink writing felt pen 10 may include a refillable free ink writing felt pen body 12 and a nib 18. The refillable free ink writing felt pen body 12 may include a liquid ink tank 16 and a nib receiving part 14. The nib 18 may be received in the nib receiving part 14. The nib receiving part 14 may include a breaking part 14A.

In the exemplary embodiment shown in FIG. 1, the nib receiving part 14 has a cylindrical shape. This is a non-limiting example.

The liquid ink tank 16 may include liquid ink. When the liquid ink tank 16 includes ink, the liquid ink may travel through the nib 18 so as to be delivered to a writing support.

When the liquid ink tank 16 is empty, the liquid ink tank 16 of the refillable free ink writing felt pen body 12 of the refillable free ink writing felt pen 10 may be refilled with fresh liquid ink.

The refillable free ink writing felt pen 10 may be refilled with fresh liquid ink with an exemplary nib 20 according to embodiments of the present disclosure, as shown in FIG. 2.

The nib 20 may include a body 22 and a dry ink tank 24.

The dry ink tank 24 may include dry ink 28. The dry ink 28 may be a solid that dissolves in water so as to make a suspension or a solution of liquid ink.

The body 22 of the nib 20 may include a first end 22A, configured to deliver ink to a writing support and a second end 22B, opposite the first end 22A, configured to be inserted in the nib receiving part 14 of the refillable free ink writing felt pen body 12 of the refillable free ink writing felt pen 10.

The dry ink tank 24 may be delimited by the second end 22B of the body 22 of the nib 20 and a dry ink tank wall 32. The dry ink tank wall 32 of the dry ink tank 24 of the exemplary nib 20 of FIG. 2 may include a tubular wall 30 having a first end 30A attached to the second end 22B of the body 22 of the nib 20 and a second end 30B, opposite the first end 30A of the tubular wall 30. A breakable portion 26 may be attached to the second end 30B of the tubular wall 30. The breakable portion 26 may be made from the same material as the tubular wall 30. As further discussed below, breakable portion 26 may be a water-soluble film. Either structure, breakable portion 26 or water-soluble film 26, may be used in aspects of the invention. The dry ink tank wall 32 may thus include the tubular wall 30 and the breakable portion 26 and the dry ink tank 24 may be delimited by the second end 22B of the body 22 of the nib 20 and the dry ink tank wall 32.

As a non-limiting example, the tubular wall 30 may be a cylindrical wall. It is to be understood that the shape of the section of the tubular wall 30 is complementary to the section of the nib receiving part 14.

The tubular wall 30 may include polypropylene or polyethylene.

The tubular wall 30 may be made of a non-porous material.

The body 22 of the nib 20 may be a sintered powder nib comprising polypropylene or polyethylene.

The body 22 of the nib 20 may include fibres agglomerated by a resin, the fibres being polyester, acrylic, polyamide or polyacrylonitrile and the resin being polyurethane or urea aminoplast.

The body 22 of the nib 20 may be an extruded nib comprising polyacetal, polypropylene or polyethylene.

As shown on FIG. 2, the breaking part 14A of the receiving part 14 of the refillable free ink writing felt pen body 12 may be configured to break the breakable portion 26 of the dry ink tank 24 of the nib 20 upon insertion of the nib 20 into the nib receiving part 14.

FIG. 5 shows a flow chart of a method 100 for filling the refillable free ink writing felt pen body 12 according to embodiments of the present disclosure.

The method 100 for filling the refillable free ink writing felt pen body 12 of the refillable free ink writing felt pen may include a step of removing 110 the used nib 18 received in the nib receiving part 14 of the refillable free ink writing felt pen body 12.

The method 100 may include a steps of filling 102 the liquid ink tank 14 with water.

The method 100 may include a step of inserting 104 the nib 20 in the nib receiving part 14.

The method 100 may include a step of breaking 106 the breakable portion 26 of the dry ink tank 24 with the breaking part 14A of the nib receiving part 14 so as to free the dry ink 28.

The method 100 may include a step of mixing 108 the dry ink 28 and the water so as to make fresh liquid ink.

As shown on FIG. 6, filling 102 the liquid ink tank 16 with water 34 may be carried out through the nib receiving part 14. The used nib 18 may thus be removed before the filling step 102 and the insertion step 104 may be carried out after the filling step 102.

As shown in FIG. 7, filling 102 the liquid ink tank with water 34 may be carried out through an opening 12C of the liquid ink tank 16, for example through the opening 12C of the refillable free ink writing felt pen body 12. As shown in FIG. 7, the refillable free ink writing felt pen body 12 may include two parts, a front part 12A that may include the nib receiving part 14 and a rear part 12B which may be reversibly attached and fixed to the front part 12A so as to form the liquid ink tank 16.

The front part 12A and the rear part 12B may be attached to one another by screwing the front part 12A to the rear part 12B. This is a non-limiting example of reversible attachment. In the example shown in FIG. 7, the filling step 102 may be carried out before or after the removing step 110 of the used nib and/or before or after the insertion step 104 of the nib 20.

The used nib may be a nib free of a dry ink tank, such as the nib 18 shown in FIG. 1. The used nib may be one nib 20 from which the water-soluble film 26 has been dissolved and which is free of dry ink 28.

FIG. 8 shows the refillable free ink writing felt pen 10 after refilling. After refilling, the refillable free ink writing felt pen 10 may comprise the body 22 of nib 20. The breakable portion 26 may have been broken by the breaking part 14A, thus freeing the dry ink 28 from the dry ink tank and the dry ink 28 may be mixed with the water so as to make fresh liquid ink 36. The refillable free ink writing felt pen 10 may be ready to use with a refilled liquid ink tank and a fresh nib.

FIG. 3 shows a representation of another exemplary nib 20 according to embodiments of the present disclosure.

The exemplary nib 20 of FIG. 3 differs from the exemplary nib 20 of FIG. 2 in that the tubular wall 30 is made of the same material as the body 22 of the nib 20. The dry ink tank wall 32 may thus include the tubular wall 30 and the water-soluble film 26 and the dry ink tank 24 may be may be delimited by the second end 22B of the body 22 of the nib 20 and the dry ink tank wall 32.

FIG. 4 shows an exemplary refilling kit 60. The exemplary refilling kit 60 may include three nibs 20. This is a non-limiting example and the refilling kit 60 may include a different number of nibs 20.

The nibs 20 shown in FIG. 4 may be nibs 20 as shown in FIG. 2. This is a non-limiting example and the nibs 20 in the refilling kit 60 may be any nib 20 as defined-above. For example, the nibs 20 may be the nib 20 of FIG. 2 or 3.

FIG. 4 also shows an exemplary writing kit 50 according to embodiments of the present disclosure.

As shown in FIG. 4, the writing kit 50 may include a refillable free ink writing felt pen body 12 and a refilling kit 60.

As shown in FIG. 4 in dashed line, the refillable free ink writing felt pen body 12 may include a nib 18 free of a dry ink tank received in the nib receiving part 14 of the refillable free ink writing felt pen body 12.

When the nib received in the nib receiving part 14 is free of a dry ink tank, the liquid ink tank 16 of the refillable free ink writing felt pen body 12 may include liquid ink. The refillable free ink writing felt pen 10 is thus ready to be used.

As shown in FIG. 4 in dashed line, the refillable free ink writing felt pen body 12 may include a nib 20 including of a dry ink tank 24, the nib 20 being received in the nib receiving part 14 of the refillable free ink writing felt pen body 12.

When the nib 20 received in the nib receiving part 14 includes a dry ink tank 24, the liquid ink tank 16 of the refillable free ink writing felt pen body 12 may be empty. Thus, before the first use of the refillable free ink writing felt pen 10, the user may remove the nib 20 from the nib receiving part 14 and fill the liquid tank with water. The user may then insert the nib 20 in the nib receiving part 14, dissolve the water-soluble film and mix the water and the dry ink so as to form fresh liquid ink.

As shown in FIG. 4, the refillable free ink writing felt pen body 12 may be free of nib.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Where any standards of national, international, or other standards body are referenced (e.g., ISO, etc.), such references are intended to refer to the standard as defined by the national or international standards body as of the priority date of the present specification. Any subsequent substantive changes to such standards are not intended to modify the scope and/or definitions of the present disclosure and/or claims.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

The invention claimed is:

1. A writing kit comprising a refillable free ink writing felt pen body and one or more nibs, wherein the refillable free ink writing felt pen body comprises a nib receiving part and a liquid ink tank, the nib receiving part comprising a breaking part configured to break a breakable portion of a dry ink tank of a nib of the one or more nibs upon insertion of the nib into the nib receiving part, wherein each of the one or more nibs comprises:

a body comprising:

a first end, configured to deliver ink to a writing support;

a second end, opposite the first end, configured to be inserted in the nib receiving part of the refillable free ink writing felt pen body of a refillable free ink writing felt pen; and the dry ink tank comprising dry ink, the dry ink tank being delimited by the second end of the body of the nib and a dry ink tank wall comprising the breakable portion.

2. The writing kit according to claim 1, wherein a nib free of a dry ink tank is received in the nib receiving part of the refillable free ink writing felt pen body.

3. The writing kit according to claim 1, wherein the dry ink tank wall comprises a tubular wall having a first end attached to the second end of the body of the nib and a second end, opposite the first end of the tubular wall, the breakable portion being attached to the second end of the tubular wall.

4. The writing kit according to claim 3, wherein the breakable portion is made of the same material as the tubular wall.

5. The writing kit according to claim 3, wherein the tubular wall is made of a non-porous material.

6. The writing kit according to claim 5, wherein the tubular wall comprises polypropylene or polyethylene.

7. The writing kit according to claim 1, wherein the body of the nib is a sintered powder nib comprising polypropylene or polyethylene.

8. The writing kit according to claim 1, wherein the body of the nib comprises fibres agglomerated by a resin, the resin being polyurethane or urea aminoplast.

9. The writing kit according to claim 1, wherein the body of the nib is an extruded nib comprising polyacetal, polypropylene or polyethylene.

10. The writing kit according to claim 1, wherein the body of the nib comprises fibres agglomerated by a resin, the fibres being polyester, acrylic, polyamide or polyacrylonitrile.

11. The writing kit according to claim 1, wherein the body of the nib comprises fibres agglomerated by a resin, the fibres being polyester, acrylic, polyamide or polyacrylonitrile and the resin being polyurethane or urea aminoplast.

12. A method for filling a refillable free ink writing felt pen body, wherein the refillable free ink writing felt pen body comprises a nib receiving part and a liquid ink tank, the nib receiving part comprising a breaking part configured to break a breakable portion of a dry ink tank of a nib upon insertion of the nib into the nib receiving part, the method comprising:

filling the liquid ink tank with water;

inserting the nib in the nib receiving part, wherein the nib comprises a body comprising: a first end, configured to deliver ink to a writing support; a second end, opposite the first end, configured to be inserted in the nib receiving part of the refillable free ink writing felt pen body of a refillable free ink writing felt pen; and the dry ink tank comprising dry ink, the dry ink tank being delimited by the second end of the body of the nib and a dry ink tank wall comprising the breakable portion;

breaking the breakable portion of the dry ink tank with the breaking part of the nib receiving part so as to free the dry ink;

mixing the dry ink and the water so as to make fresh liquid ink.

13. The method according to claim 12, wherein a used nib received in the nib receiving part is removed from the refillable free ink writing felt pen body.

14. The method according to claim 12, wherein filling the liquid ink tank with water is carried out through the nib receiving part.

15. The method according to claim 12, wherein filling the liquid ink tank with water is carried out through an opening of the liquid ink tank.

16. The method according to claim 12, wherein the refillable free ink writing felt pen body comprises a first section including the nib receiving part and a second section, and wherein the first section and the second section are configured to be reversibly attached.

17. The method according to claim 16, wherein filling the liquid ink tank with water is carried out through an opening of the second section.

18. The method according to claim 16, wherein the first section and the second section are reversibly attached by screwing the first section to the second section.

19. The method according to claim 12, wherein the dry ink tank wall comprises a tubular wall having a first end attached to the second end of the body of the nib and a second end, opposite the first end of the tubular wall, the breakable portion being attached to the second end of the tubular wall.

20. The method according to claim 19, wherein the breakable portion is made of the same material as the tubular wall.

* * * * *